US005524686A

United States Patent [19]

Takada et al.

[11] Patent Number: 5,524,686

[45] Date of Patent: Jun. 11, 1996

[54] HEAVY DUTY TIRE INCLUDING NARROW CIRCUMFERENTIAL GROOVES

[75] Inventors: Yoshiyuki Takada; Keiji Yasufuku, both of Akashi, Japan

[73] Assignee: Sumitomo Rubber Industries, Ltd., Hyogo-ken, Japan

[21] Appl. No.: 305,014

[22] Filed: Sep. 13, 1994

[30] Foreign Application Priority Data

Sep. 14, 1993 [JP] Japan .................................... 6-252543

[51] Int. Cl.[6] ........................ B60C 101/00; B60C 109/00

[52] U.S. Cl. ........................................................ 152/209 R

[58] Field of Search ........................... 152/209 R, 209 D, 152/DIG. 3

[56] References Cited

U.S. PATENT DOCUMENTS

| | | | |
|---|---|---|---|
| 3,831,654 | 8/1974 | Boileau | 152/209 R |
| 4,230,512 | 10/1980 | Makino et al. | 152/209 R |
| 4,282,914 | 8/1981 | Takigawa | 152/209 D |
| 4,353,402 | 10/1982 | Burche et al. | 152/209 R |
| 4,515,197 | 5/1985 | Motomura et al. | 152/209 R |
| 5,345,988 | 9/1994 | Kabe et al. | 152/209 R |

FOREIGN PATENT DOCUMENTS

| | | | |
|---|---|---|---|
| 128807 | 11/1978 | Japan | 152/209 R |
| 43104 | 2/1992 | Japan | 152/209 R |

*Primary Examiner*—Steven D. Maki
*Attorney, Agent, or Firm*—Birch, Stewart, Kolasch & Birch

[57] ABSTRACT

A heavy duty tire having an improved tread wear resistance, which comprises a tread portion provided on each side of the tire equator with a wide circumferential groove and a narrow circumferential groove. The wide circumferential groove is spaced apart from the tire equator by an axial distance of 15 to 25% of the tread width. The narrow circumferential groove is disposed on the axially inside of the wide circumferential groove and spaced apart from the axially inner groove edge of the wide circumferential groove by an axial distance of 0.02 to 0.05 times the tread width. The depth of the wide circumferential groove is in the range of 0.05 to 0.08 times the tread width. The depth of the narrow circumferential groove is in the range of 0.7 to 1.0 times the depth of the wide circumferential groove. The groove width of the narrow circumferential groove is in the range of 1.5 to 2.5 mm.

10 Claims, 5 Drawing Sheets

HEAVY DUTY TIRE INCLUDING NARROW CIRCUMFERENTIAL GROOVES

BACKGROUND OF THE INVENTION

The present invention relates to a heavy duty tire of which tread wear resistance is improved.

Recently, heavy duty cars such as trucks, buses and the like are required to run at a high speed because the expressway networks are improving. Also it is desired to reduce running costs. Therefore, the tires used in such heavy duty cars are required to have a highly improved tread wear resistance.

On the other hand, when the tread of a heavy duty tire is worn and the depth of the tread grooves reaches about 50%, the tread life has reached its end. This type of tread life is called the first life.

In general, in order to improve drainage and wet grip performance, a heavy duty tire is provided with circumferential grooves defining a tread pattern, and a five-rib pattern comprising four circumferential grooves as shown in FIG. 6(A) and (B) has been widely used.

In such a five-rib pattern, however, uneven wear (shown in FIG. 6(B) by parallel-hatching) is caused along the edges of the circumferential grooves (a), which greatly shortens the first life.

Also, a three-rib pattern comprising two circumferential grooves (a), for example as shown in FIG. 7, has been used since the rib is increased in the rigidity, which is of great advantage in preventing wear, but no advantage in providing grip performance.

SUMMARY OF THE INVENTION

It is therefore, an object of the present invention to provide a heavy duty tire in which the tread wear resistance is improved and the first tread life is prolonged by making the tread wear in an even manner, i.e. by reducing uneven wear.

According to one aspect of the present invention, a heavy duty tire is provided which comprises a tread portion with a pair of tread edges, and the tread portion is provided on each side of the tire equator with a wide circumferential groove and a narrow circumferential groove, each groove extending continuously in the circumferential direction of the tire.

The wide circumferential groove is spaced axially apart from the tire equator by a distance M of 15 to 25% of the tread width WT between the tread edges. The narrow circumferential groove is disposed axially inside of the wide circumferential groove and spaced axially apart from the axially inner groove edge of the wide circumferential groove by a distance L of 0.02 to 0.05 times the tread width WT. The depth HG1 of the wide circumferential groove is in the range of 0.05 to 0.08 times the tread width WT. The depth HG2 of the narrow circumferential groove is in the range of 0.7 to 1.0 times the depth HG1 of the wide circumferential groove. The groove width WG2 of the narrow circumferential groove is in the range of 1.5 to 2.5 mm. Therefore, between the wide circumferential groove and the narrow circumferential groove, a narrow rib L extending continuously in the circumferential direction of the tire is formed.

If the distance L is less than 0.02 times the tread width WT, the rigidity of the rib decreases, and small objects on the road surface such as stone are liable to be entrapped in the narrow circumferential groove. If the distance L is more than 0.05 times the tread width WT, the rib rigidity increases, and uneven wear in liable to occur along the narrow circumferential groove.

By providing narrow circumferential grooves, the extension of uneven wear from the wide circumferential groove edge is prevented.

If the distance M is less than 15% of the tread width WT, the rigidity of the tread central portion is insufficient, and uneven wear is liable to occur from the wide circumferential groove edges. If the distance M is more than 25% of the tread width WT, water drainage from the tread central portion is insufficient and wet grip is not good.

If the depth HG2 is less than 0.7 times the depth HG1, the uneven wear preventing effect by the narrow circumferential grooves cannot be obtained in the end of the first life.

If the depth HG2 is more than 1.0 times the depth HG1, the tread rib formed between the wide and narrow circumferential grooves is decreased in rigidity, and uneven wear and tear-off are likely to occur.

If the narrow circumferential grooves width WG2 is less than 1.5 mm, the groove closes in the ground contacting patch of the tire. As a result, the desired drainage cannot be obtained, and uneven wear is caused along the wide circumferential groove. If the width is increased over 2.5 mm, the effect of preventing uneven wear is not enhanced any more, and the wear resistance is decreased.

In the present invention, the above-mentioned factors are organically combined in unity so as to prevent the occurrence of uneven wear in the tread portion and to make the tread wear even, whereby wear resistance can be improved.

BRIEF DESCRIPTION OF THE DRAWINGS

An embodiment of the present invention will now be described in detail in conjunction with the accompanying drawings, wherein.

DETAILED DESCRIPTION OF THE INVENTION

Figure 1:
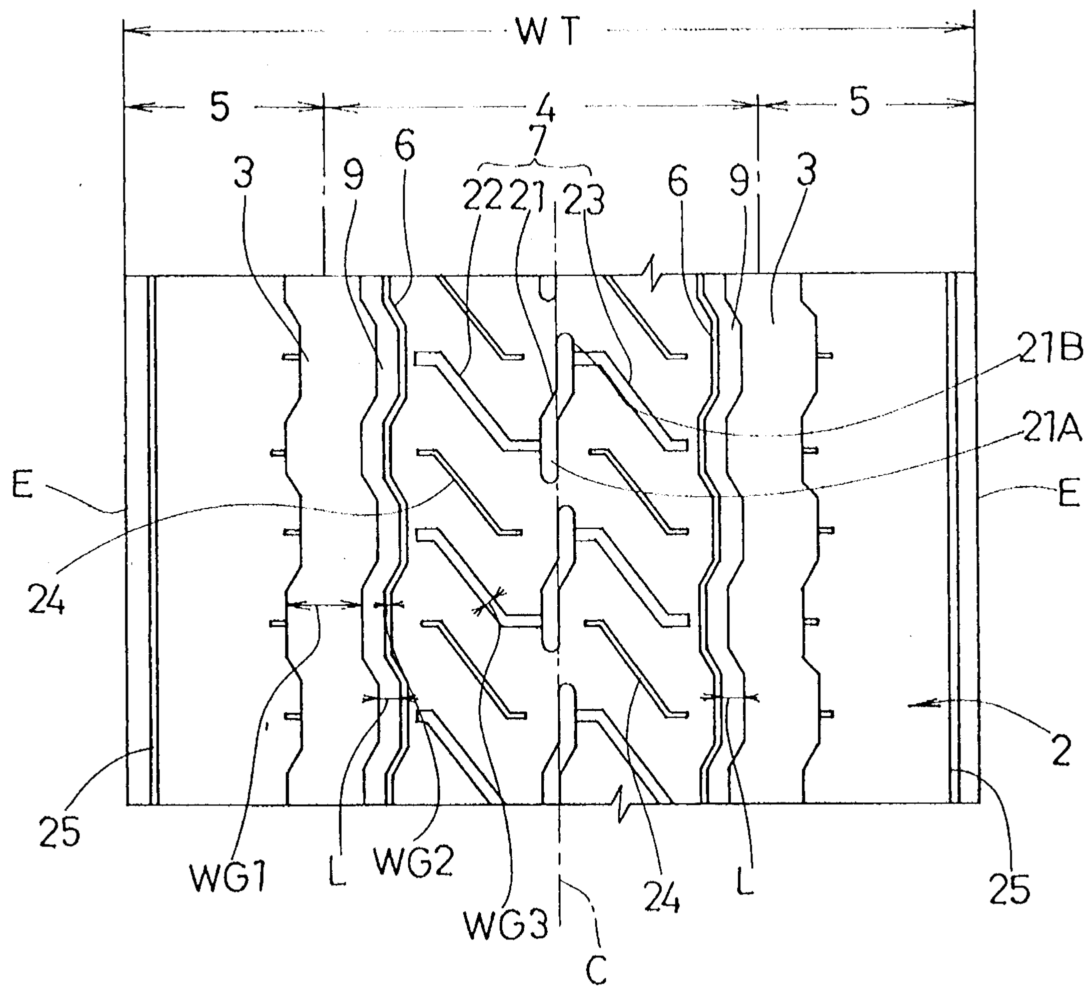
FIG. 1 is a developed plan view of a tread pattern for the heavy duty tire of the present invention.
Figure 2:
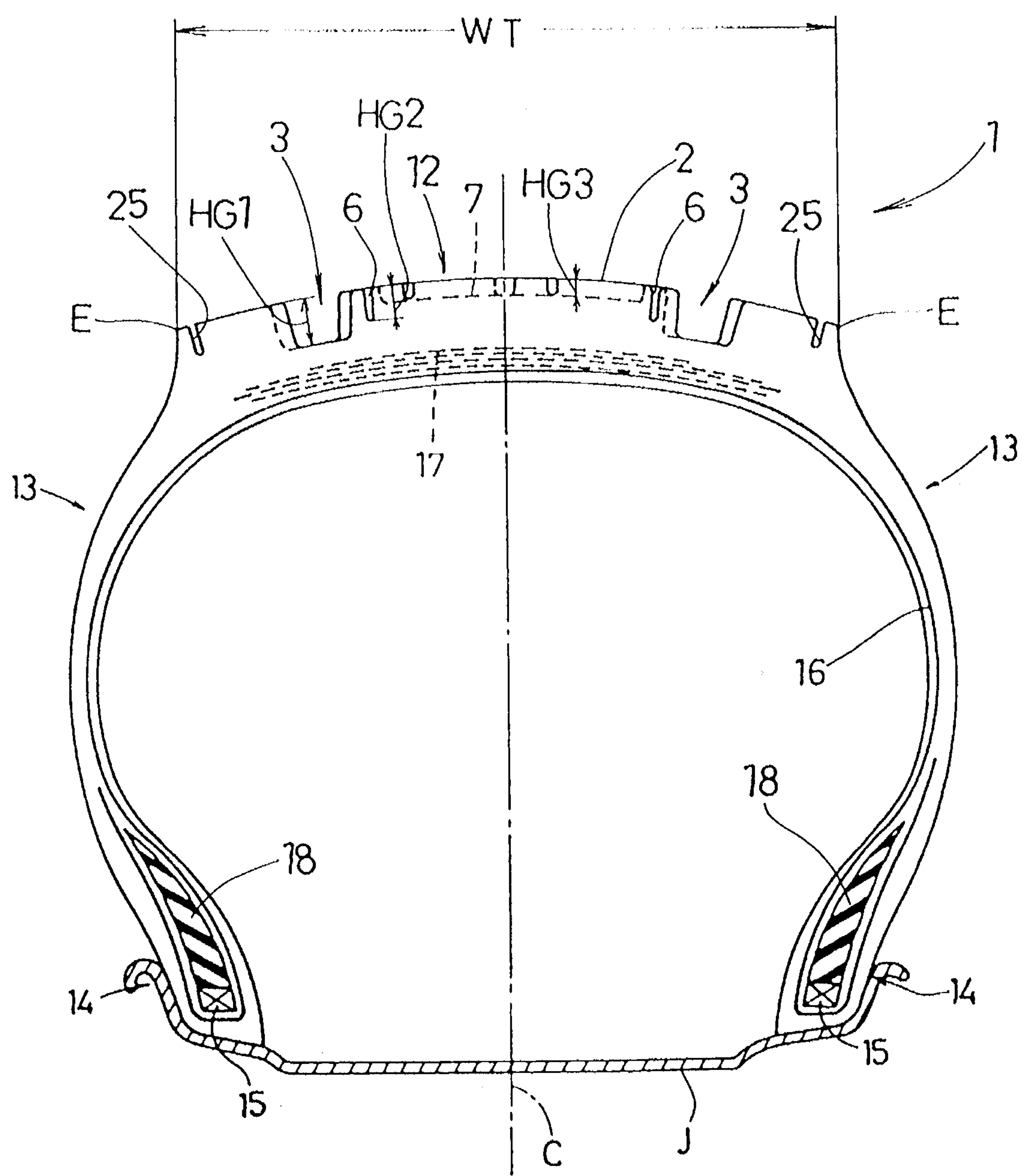
FIG. 2 is a cross sectional view of the tire.

In FIGS. 1 and 2, a heavy duty tire 1 according to the present invention comprises a tread portion 12 with a pair of axial edges E, a pair of sidewall portions 13 extending radially inwardly from the tread edges E, a pair of bead portions 14 located at the radially inner ends of the sidewall portions, each provided with a bead core 15, a carcass 16 extending between the bead portions 14 through the tread portion 2 and sidewall portions 13 and turned up around the bead cores 15 from axially inside to the outside thereof, a belt layer 17 disposed radially outside the carcass 16 and inside the tread portion 12, and a bead apex 18 of rubber tapering radially outwardly from the bead core 15 and disposed between the carcass main portion and each turned up portion.

The carcass 16 in this embodiment comprises a single ply of cords arranged radially at an angle of 70 to 90 degrees with respect to the tire equator C in a radial or semiradial structure. For the carcass cords, organic fiber cords, e.g. nylon, polyester, aromatic polyamide and the like are used. Steel cords may be used, if need be.

The belt layer 17 in this embodiment comprises four plies of parallel cords.

For the belt cords, steel cords and/or organic fiber cords, e.g. nylon, polyester, aromatic polyamide fiber and the like can be used.

The above-mentioned tread portion 2 is provided on each side of the tire equator C with a single wide circumferential groove 3, whereby the tread portion 2 is divided into a tread central portion 4 defined between the two wide circumferential grooves 3, and a pair of tread shoulder portions 5 each defined between one of the wide circumferential grooves 3 and one of the tread edges E.

The wide circumferential groove 3 is axially spaced apart from the tire equator C by a distance M of 15 to 25% of the tread width WT.

The wide circumferential groove 3 has a depth HG1 in the range of from 0.05 to 0.08 times the tread width WT, and an axial width WG1 in the range of from 0.04 to 0.16 times the tread width WT.

Further, the tread central portion 4 is provided near the wide circumferential grooves 3 with a pair of narrow circumferential grooves 6, each narrow circumferential groove extending along each of the wide circumferential grooves 3.

Each of the narrow circumferential grooves 6 is spaced axially apart from the axial inner edge of the adjacent wide circumferential groove 3 by a distance L in the range of from 0.02 to 0.05 times the tread width WT.

The narrow circumferential groove 6 has a depth HG2 in the range of from 0.7 to 1.0 times the depth HG1 of the wide circumferential groove 3, and an axial width WG2 in the range of from 1.5 to 2.5 mm.

Therefore, a narrow width rib 9 is formed between each of the wide circumferential grooves 3 and each of the narrow circumferential grooves 6.

Here, the tread width WT is the axial distance measured between the tread edges E under the unloaded state in which the tire is mounted on its regular rim and inflated to the specified maximum pressure. The tread edges E correspond to the axially outermost edges of the ground contacting region of the tread face, that is, the foot print under a loaded state in which the tire is mounted on a regular rim, inflated to a specified maximum pressure, and loaded with a specified maximum tire load.

The above-mentioned distance M is the axial distance measured from the tire equator C to the groove center of the wide circumferential groove at the groove top or tread face.

In this embodiment, each of the wide circumferential grooves 3 is a nonlinear groove.

Each of the groove edges comprises alternating circumferential segments and oblique segments as shown in FIG. 1, but the edges of each groove are parallel with each other. Accordingly, the axial width is constant along the tire circumferential longitudinal direction.

The narrow circumferential grooves 6 in this embodiment are also a nonlinear groove having a configuration similar to that of the wide circumferential groove 3.

Each of the narrow circumferential grooves 6 extends parallel to the adjacent wide circumferential groove 3, whereby the rib 9 has constant axial width L along the tire circumferential direction.

Further, the tread central portion 4 in this embodiment is provided between the two narrow circumferential grooves 6 with a plurality of sets of crank-shaped grooves 7. The set of grooves 7 include a center groove 21 and two lateral grooves 22 and 23.

The central groove 21 has a short oblique portion in the middle of the length, and the remaining portions 21A and 21B are parallel to the tire equator C, thereby having a crank shape.

On the tire equator C, a plurality of central grooves 21 are arranged in the tire circumferential direction, while leaving a space between the circumferential extreme ends of the circumferentially adjacent grooves 21.

The lateral groove 22, 23 has a long oblique portion in the middle of the length, and the remaining portions are parallel to the tire axial direction, thereby having a crank shape.

The lateral grooves 22 and 23 are connected to the central groove 21.

In FIG. 1, the oblique portion of the central groove 21 is centered on the tire equator C, and the portion 21A (hereinafter lower portion) and the portion 21B (hereinafter upper portion) are located on the left side and right side, respectively.

The lateral groove 22 (hereinafter left groove or first lateral groove) is connected at its axially inner end with the left side edge of the lower portion 21A of the central groove 21. The oblique portion of the left groove 22 is inclined toward the upper portion 21B.

On the other hand, the lateral groove 23 (hereinafter right groove or second lateral groove) is connected at its axially inner end with the right side edge of the upper portion 21B of the central groove 21. The oblique portion of the right groove 23 is inclined toward the lower portion 21A. As a result, the three grooves 21, 22 and 23 in FIG. 1 make a configuration like the mirror image of a capital letter "N" By the provision of such grooves, the wet grip performance is improved.

In this example, a set of the lateral grooves 21, 22 and 23 are connected with each other, but not connected with another groove such as the above-mentioned circumferential grooves 3 and 6, and the axial outer ends of the lateral grooves 22 and 23 terminate before the narrow circumferential grooves 6.

However, the lateral grooves 21, 22 and 23 may be connected with the narrow circumferential grooves 6.

The above-explained set of connected grooves 7 has a groove width WG3 in the range of from 1.5 to 2.5 mm and a depth HG3 in the range of from 20 to 30% of the depth HG1 of the wide circumferential grooves 3.

If the depth is not more than 20%, the wet grip performance cannot be improved. If more than 30%, uneven wear is liable to occur starting from the connected grooves 7.

Furthermore, in order to improve the grip performance in this embodiment, especially the wet grip performance thereof, the tread portion is provided between the two narrow circumferential grooves 6 with a plurality of sipes 240 The sipe 24 is a slit or cut having no groove width or a substantially zero groove width which becomes zero in the ground contacting patch.

The sipe 24 has a crank shape which is similar to that of the lateral grooves 22 and 23, and the sipes 24 are disposed between the lateral groves 22 and 23 alternately and substantially equidistantly in the circumferential direction in a parallel relationship.

Still furthermore, in this embodiment, in order to prevent uneven wear in the tread shoulder portions, each tread shoulder portion is provided near the tread edge E with a narrow circumferential groove 25 extending straight, continuously in the circumferential direction and in parallel with the tread edge E.

In the above-mentioned example shown in FIG. 1, the wide circumferential grooves and narrow circumferential grooves have a similar zigzag configuration with the same zigzag pitch. However, the following modifications may be possible:

1) both the wide circumferential groove and narrow circumferential groove are straight grooves;
2) both the wide circumferential groove and narrow circumferential groove are zigzag grooves having zigzag pitches shifted with regard to each other; and
3) one of either the wide circumferential groove or the narrow circumferential groove is zigzag, and the other is straight.

When the wide circumferential groove is straight, the above-mentioned groove center is defined by the center line of the groove in its widthwise direction.

When the wide circumferential groove is a nonlinear groove as in the above-explained example, as the center line of the groove has an amplitude in the axial direction, the above-mentioned groove center is defined by the center of the amplitude in the axial direction.

In the case 2) or 3), if the distance L between the wide circumferential groove and the narrow circumferential groove is varied in the tire circumferential direction due to the nonlinear groove edge, the distance L is determined, using the axial center of the amplitude of the nonlinear groove edge.

When the distance L is varied in the circumferential direction, a) the maximum value of the distance L is preferably not more than 0.05 times the tread width WT, whereby the rib 9 is prevented from being partially increased in rigidity and thereby preventing the occurrence of partial wear, and
b) the minimum value of the distance L is preferably not less than 0.02 times the tread width WT, whereby the rib 9 is prevented from being torn-off or broken.

Test tires of size 285/75R24.5 having the construction shown in FIG. 2 were prepared. The example tire had the tread pattern show in FIG. 1. Reference tires 1 and 2 had a tread pattern similar to FIG. 1 but the distance L between the wide circumferential groove 3 and the narrow circumferential grooves 6 were outside the above-explained range. Prior art tire had the tread pattern shown in FIG. 7. The specifications thereof are shown in Table 1.

The test tire was mounted on a regular rim and inflated to a regular inner pressure. Then the tire was installed on a test car and run at an average speed of 80 to 100 km/H for 70,000 kilometers. And the wear of the tread portion was measured.

The test results are also shown in Table 1 and FIGS. 3, 4, 5 and 7.

TABLE 1

Figure 3:
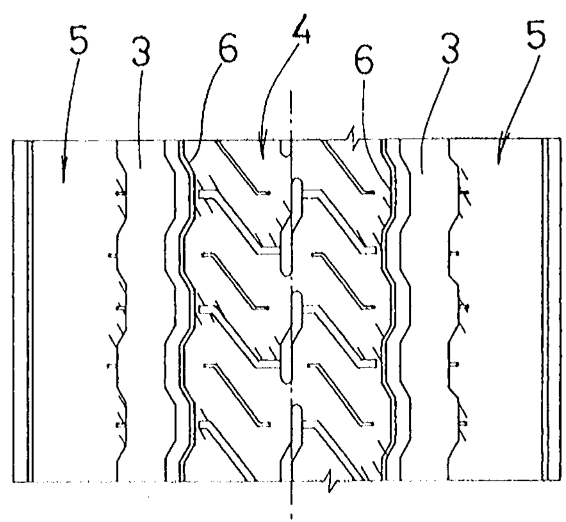
FIGS. 3, 4 and 5 are plan views showing the results of tread wear resistance tests.
Figure 4:
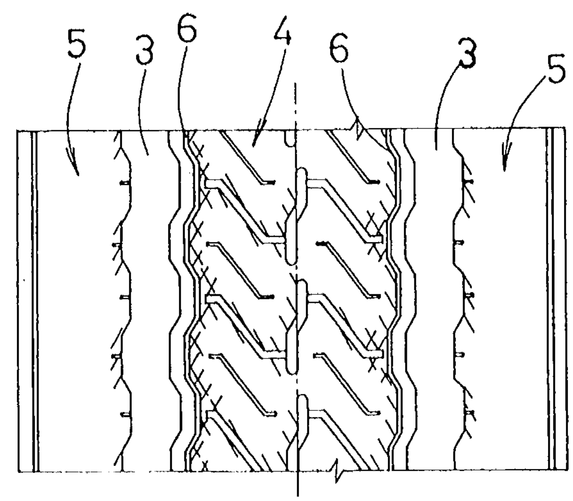
Figure 5:
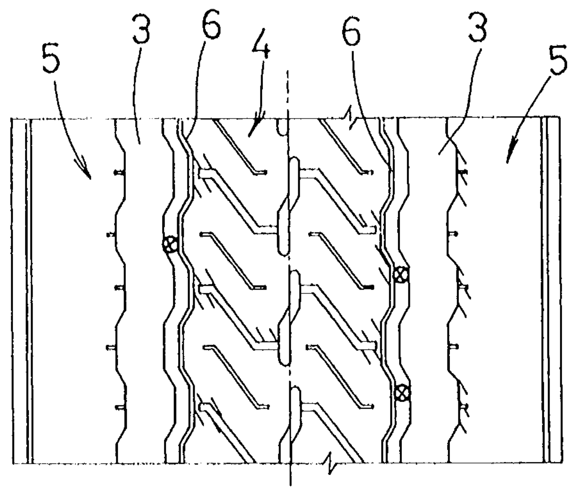
Figure 6A:
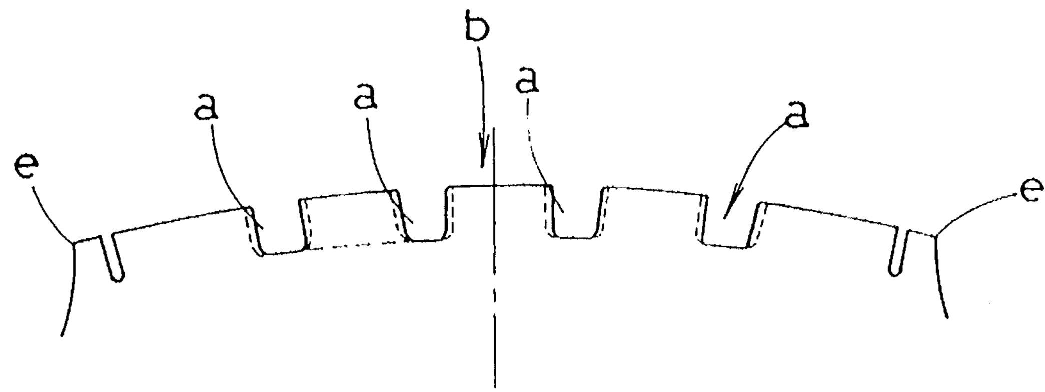
FIG. 6(A) is a cross sectional view of the tread portion of a prior art tire.
Figure 6B:
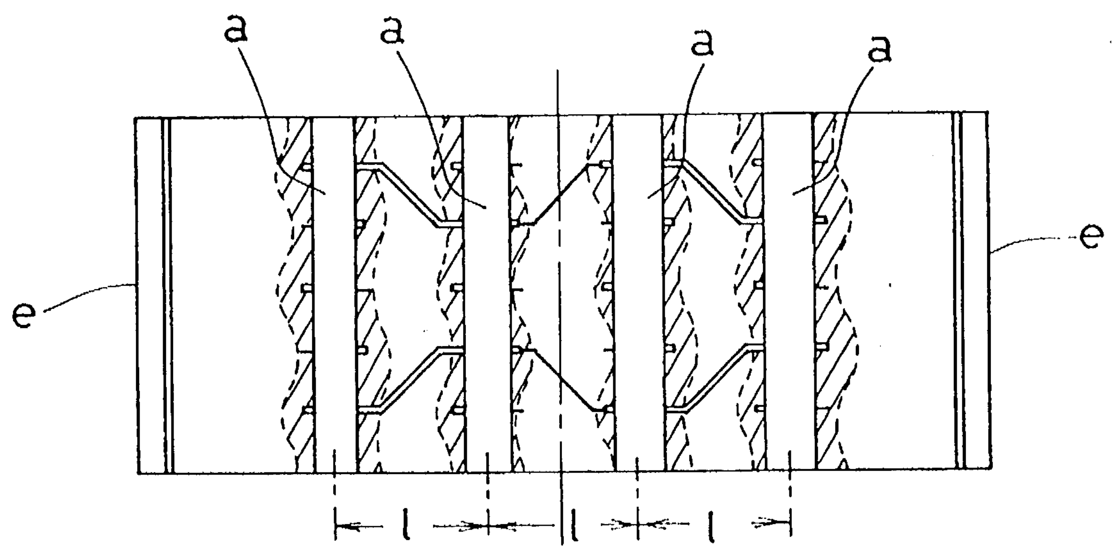
FIG. 6(B) is a developed plan view thereof for explaining the tread wear.
Figure 7:
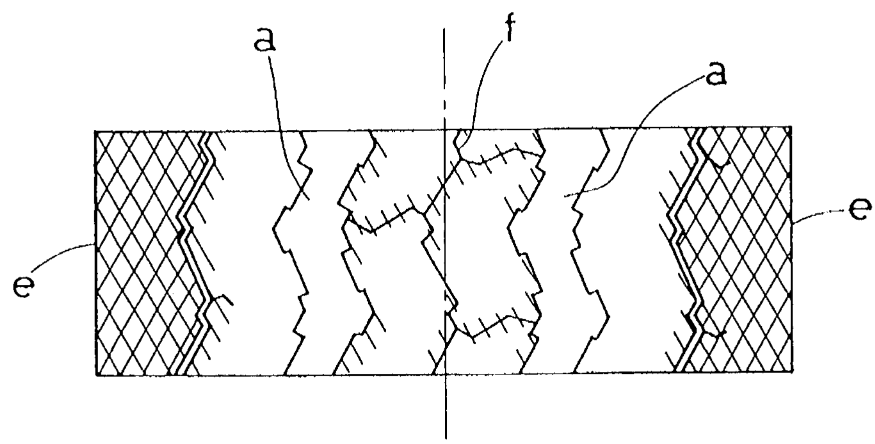
FIG. 7 is a developed plan view of the tread portion of a prior art tire for explaining the tread wear.
Figure 8:
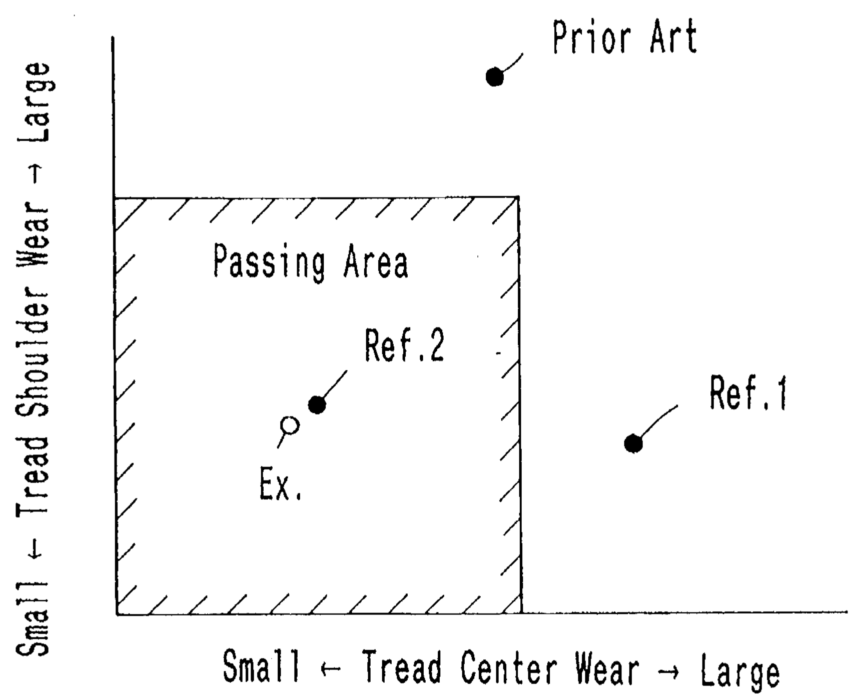
FIG. 8 is a graph showing the results of the tread wear resistance test.

| Tire | Ex. | Ref. 1 | Ref. 2 | Prior |
|---|---|---|---|---|
| Tread pattern | FIG. 1 | FIG. 1 | FIG. 1 | FIG. 7 |
| No. of ribs | 3 | 3 | 3 | 3 |
| Tread radius of curvature (mm) | 500 to 520 | 500 to 520 | 500 to 520 | 500 to 520 |
| Tread width WT (mm) | 216 | 216 | 216 | 216 |
| Depth HG1 (mm) | 14.2 | 14.2 | 14.2 | 14.2 |
| HG1/WT | 0.071 | 0.071 | 0.071 | 0.071 |
| Distance L (mm) | 0.035 | 0.055 | 0.017 | – |
| Test result Uneven wear | FIG. 3 | FIG. 4 | FIG. 5 | FIG. 7 |

* In FIGS. 3, 4, 5 and 7, the parallel-hatched area indicates that the uneven wear was small. The cross-hatched area indicates that the uneven wear was great.
* Example, Reference and Prior art tires had substantially same pattern pitches (tread design cycle pitches).

Through the test, it was confirmed that uneven wear of the Example tire according to the present invention is reduced.

In the Reference tire 2, uneven wear was small. But, the rib formed between the narrow and wide circumferential grooves was liable to be torn off, and small objects such as stone and the like were liable to be entrapped in the grooves.

As described above, in a heavy duty tire according to the present invention, as the narrow circumferential grooves are disposed axially inside the wide circumferential grooves leaving a specific space therebetween, the occurrence of uneven wear in the tread portion is reduced and the tread wear is evened between the tread center region and shoulder region. Therefore, the first life of the tread is prolonged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A heavy duty tire comprising a tread portion with a pair of tread edges, said tread portion provided on each side of the tire equator with a wide circumferential groove and a narrow circumferential groove, each groove extending continuously in the circumferential direction of the tire, each of said narrow circumferential grooves being disposed axially inside of the respective wide circumferential groove and spaced apart from the axially inner groove edge of said wide circumferential groove by an axial distance of 0.02 to 0.05 times the tread width, the depth of said wide circumferential groove being in the range of 0.05 to 0.08 times the tread width, the depth of said narrow circumferential groove being in the range of 0.7 to 1.0 times said depth of the wide circumferential groove, and the groove width of the narrow circumferential groove being in the range of 1.5 to 2.5 mm, said tread portion further provided between the two narrow circumferential grooves with a plurality of sets of crank-shaped grooves, each set comprising a center groove, a first lateral groove, and a second lateral groove, each of the center groove, first lateral groove, and second lateral groove comprising two parallel portions with an oblique middle portion extending therebetween to define said crank-shape, the central groove extending along the tire equator, the first lateral groove extending from one of the parallel portions of the center groove towards one of the narrow circumferential grooves; and the second lateral groove extending from the other parallel portion of the center groove towards the other narrow circumferential groove.

2. The heavy duty tire according to claim 1, wherein said crank-shaped grooves have a depth of not more than 30% of said depth of the wide circumferential groove.

3. The heavy duty tire according to claim 2, wherein said crank-shaped grooves have a depth of 20% to 30% of said depth of the wide circumferential groove.

4. The heavy duty tire according to claim 3, wherein said first and second lateral grooves terminate before the narrow circumferential grooves.

5. The heavy duty tire according to claim 3, wherein the oblique middle portion of each lateral groove extending from one of the parallel portions of the center groove is inclined towards the other parallel portion of the center lateral groove.

6. The heavy duty tire according to claim 2, wherein said first and second lateral grooves terminate before the narrow circumferential grooves.

7. The heavy duty tire according to claim 2, wherein the oblique middle portion each lateral groove extending from one of the parallel portions of the center groove is inclined towards the other parallel portion of the center lateral groove.

8. The heavy duty tire according to claim 1, wherein said first and second lateral grooves terminate before the narrow circumferential grooves.

9. The heavy duty tire according to claim 8, wherein the oblique middle portion of each lateral groove extending from one of the parallel portions of the center groove is inclined towards the other parallel portion of the center lateral groove.

10. The heavy duty tire according to claim 1, wherein the oblique middle portion of each lateral groove extending from one of the parallel portions of the center groove is inclined towards the other parallel portion of the center lateral groove.

* * * * *